United States Patent [19]

Doran et al.

[11] Patent Number: 5,419,885
[45] Date of Patent: May 30, 1995

[54] METHOD FOR THE DESTRUCTIVE SCRUBBING OF METHYL CHLORIDE GAS

[75] Inventors: Henry Doran, Bray; Brian Keaveny, Wicklow, both of Ireland

[73] Assignee: Schering Corporation, N.J.

[21] Appl. No.: 168,896

[22] Filed: Dec. 15, 1993

[51] Int. Cl.$^6$ .............................................. A62D 3/00
[52] U.S. Cl. .............................. 423/245.2; 423/240 R; 588/206
[58] Field of Search .................. 423/245.1, 245.2, 247, 423/240 R; 588/206

[56] References Cited

FOREIGN PATENT DOCUMENTS

| 1282317 | 4/1991 | Canada . |
| 49-094614 | 9/1974 | Japan . |
| 49-094615 | 9/1974 | Japan . |
| 58-194823 | 11/1983 | Japan . |

OTHER PUBLICATIONS

Chem. Abstracts CA88(10):65463q.
Chem. Abstracts CA82(23):150543m.

*Primary Examiner*—Gary P. Straub
*Attorney, Agent, or Firm*—Paul A. Thompson

[57] ABSTRACT

A process for destructively scrubbing methyl chloride gas comprising contacting the gas with a scrubbing solution comprising ethanolamine is described.

12 Claims, No Drawings

METHOD FOR THE DESTRUCTIVE SCRUBBING OF METHYL CHLORIDE GAS

BACKGROUND OF THE INVENTION

Methyl chloride is a toxic gas known to be injurious to humans, attacking the liver, kidneys and CNS. Methyl chloride can be formed as a byproduct during certain chemical reactions. For example methyl chloride is formed during the conversion of a methylamino moiety in a tertiary amine to a urethane using ethylchloroformate. To avoid the hazards associated with a release to the environment when such reactions are run on a commercial scale, it is necessary to employ a scrubbing system to trap the methyl chloride off-gas produced.

One method known for removing methyl chloride as an off-gas involves venting the gas to a reactor containing methanolic KOH. The methyl chloride is converted to methanol or dimethyl ether and KCl by reaction with the KOH. However, this method is inefficient, as the reaction stops after converting only a small portion of the methyl chloride, resulting in release to the environment of the unreacted gas upon disposal of the scrubbing solution.

Another known method for scrubbing methyl chloride involves solubilizing the gas in a continuous stream of methanol. While this method is capable of removing the methyl chloride off-gas, it too is unsatisfactory, requiring the use of large volumes of methanol. In addition, the methanolic solution of methyl chloride thus obtained must be disposed of in a manner that avoids release of the dissolved gas into the environment. Given the relatively low boiling point of methyl chloride ($-24°$ C.), significant amounts of the dissolved gas are likely to escape from solution before it can all be treated.

The scrubbing of methyl chloride, is also described in Canadian Patent No. 1,282,317, via a method which involves contacting the off-gas with a scrubbing liquid comprising a vegetable or marine oil. However, this method is effective only for removal of small amounts of methyl chloride and is unsuitable for scrubbing the quantities of methyl chloride produced by commercial scale reactions.

Methods of destructively scrubbing methyl bromide are also known. In particular, Japanese Kokai JP 49127862 discloses a method involving contacting a solution of methyl bromide in isopropanol with a 20% solution of ethanolamine in water. However, application of methyl bromide technology to the control of methyl chloride emissions is in part impeded by the substantial difference in their boiling points (methyl chloride, $-24°$ C., as compared to methyl bromide, $4°$ C.). More importantly, the significantly higher chemical reactivity of methyl bromide as compared to methyl chloride precludes direct extension of this technology to the scrubbing of methyl chloride. This is further evident from the absence of any teaching or suggestion in the prior art that such technology can be applied to methyl chloride.

SUMMARY OF THE INVENTION

The present invention involves a process for destructively scrubbing methyl chloride gas comprising contacting the gas with a scrubbing solution containing ethanolamine.

Preferably the scrubbing solution comprises ethanolamine, a water soluble organic solvent and water. The water soluble organic solvent is preferably acetone or a lower alkyl alcohol, capable of solubilizing methyl chloride. The water soluble organic solvent is most preferably methanol, isopropanol or acetone.

More preferred is a scrubbing solution comprising ethanolamine in a mixture of a water soluble organic solvent and water, wherein the organic solvent is isopropanol or acetone, and the organic solvent to water ratio is in the range of 1:4 to 10:1, preferably from 1:2 to 5:1, and most preferably about 1:1. Alternatively, where the water soluble organic solvent is methanol, the ratio of organic solvent to water is in the range of 1:1 to 10:1, preferably from 2:1 to 7:1, and most preferably about 3:1.

Most preferred for scrubbing methyl chloride is a scrubbing solution comprising: 20% ethanolamine, 20% water and 60% methanol; or 20% ethanolamine, 40% water and 40% isopropanol or acetone.

DETAILED DESCRIPTION

As used herein the term "water soluble organic solvent" means a water miscible organic solvent capable of dissolving methyl chloride, such as a lower alkyl alcohol or acetone; and "lower alkyl alcohol" means a water soluble alcohol having from 1 to 4 carbon atoms, such as methanol, ethanol, isopropanol or t-butanol.

The process of the present invention employs a scrubbing solution capable of solubilizing methyl chloride at levels sufficient to capture the methyl chloride off-gas generated by commercial scale reactions. The solution is further capable of solubilizing ethanolamine at levels sufficient to react with the methyl chloride so captured. Solutions of ethanolamine in a mixture of a water soluble organic solvent and water have such properties and are preferred.

The ratio of organic solvent to water in the mixtures of the present invention can range from 1:4 to 10:1. When isopropanol or acetone is used, the solvent to water ratio is preferably in the range of 1:2 to 5:1, and most preferably is about 1:1. When methanol is used, the alcohol to water ratio is preferably in the range of about 2:1 to 7:1, and most preferably is about 3:1. Similar ratios can be employed using other solvents, such as ethanol or t-butanol.

When alcohol solvents are used and the ratio of alcohol to water is below 1:3 (e.g. 1:4), the ability of the solution to dissolve methyl chloride becomes unacceptably low. In particular, when a ratio of ethanol/water or methanol/water below 1:1 is employed (e.g. 1:2, 1:3, etc.), the solubility of methyl chloride is unacceptably low. Use of a solution of ethanolamine in water alone is incapable of solubilizing methyl chloride at levels sufficient to be practicable. Conversely, when the ratio of alcohol/water is greater than 10:1 the rate of consumption of methyl chloride by the reaction with ethanolamine becomes unacceptably slow. Use of a solution of ethanolamine in alcohol alone results in considerable levels of unreacted methyl chloride even after 24 hours.

The amount of ethanolamine present in the scrubbing solution is sufficient to quench the dissolved methyl chloride in an efficient manner. Preferably the dissolved methyl chloride is consumed within a period of 24 hours, and most preferably within 8 hours. The scrubbing solution typically contains about 20% ethanolamine. The amount of such scrubbing solution employed in the instantly claimed process is sufficient to provide an excess of ethanolamine as compared to the amount of methyl chloride to be treated. Typically the ratio of ethanolamine to methyl chloride is >1:1.

The scrubbing process of the present invention has several advantages over the prior art methods described above. For example, the solubilization methods, while effectively removing the methyl chloride off-gas, do not prevent the escape of the dissolved gas back into the environment, In contrast, the present method involves the chemical destruction of methyl chloride gas by contacting the gas with ethanolamine. The ethanolamine reacts with the methyl chloride to form N-methyl ethanolamine hydrochloride, thereby preventing the escape of methyl chloride into the environment. The N-methyl ethanolamine hydrochloride so formed is water soluble and biodegradable, and can be disposed of using standard methods. Further, unlike the methanolic KOH method which leaves substantial quantities of methyl chloride unreacted to escape into the environment, the present method results in complete chemical destruction of the methyl chloride. Finally, the present method is readily applicable to commercial scale processes and can be carried out using substantially lower volumes of scrubbing solution than the prior art methods, thereby reducing materials and disposal costs.

In the process of the present invention the scrubbing solution can be contacted with the methyl chloride off-gas using methods known in the art. For example, the scrubbing solution can be utilized in a commercially available scrubber, as described below, to trap and destroy the off-gas.

The scrubber typically comprises a first scrubber which is a commercially available packed tower scrubber in which the scrubbing liquid is recirculated. Prior to operation the sump will contain approximately 33% of the scrubbing solution, which is recirculated through the packed tower. The tower is topped by a polishing section comprising a small packed tower having smaller diameter packing. The remaining 66% of the scrubbing solution is gradually added to this polishing section during the course of scrubber operation. The scrubbing solution so added passes through the polishing section and continues down into the main tower, where it is recirculated through the sump and the main tower along with the solution originally added to the sump.

Preferably the scrubber further comprises a second scrubber, a packed tower scrubber, which is employed in sequence to remove any entrained solvent from the vent gas leaving the first scrubber. The sump for this second scrubber can be filled with scrubbing solution which is recirculated during operation.

Following scrubber operation the scrubber can be sealed to allow the chemical reaction between the scrubbing solution and the methyl chloride to reach completion. Preferably the reaction is complete within 4 hours.

Following destruction of the methyl chloride, the water soluble organic solvent can be recovered from the mixture by distillation. The residue comprising water, N-methyl ethanolamine hydrochloride and unreacted ethanolamine is readily biodegradable.

The destruction of methyl chloride dissolved in the scrubbing solution of the present invention can be monitored by capillary Gas Chromatography (GC). After exposure to methyl chloride a sample of the scrubbing solution is diluted into the appropriate solvent. For example, where the scrubbing solution comprises a methanol/water mixture, methanol is used. The diluted sample is analyzed using a 50 m capillary column having a Chrompack® WCOT fused silica on Carbowax® 400 stationary phase. Where necessary, a known percentage of a suitable internal standard, such as isobutyl alcohol, is introduced prior to dilution of the sample.

The following examples are illustrative of the process of the present invention:

EXAMPLE 1

Bubble methyl chloride into 1 L of a solution of 20% ethanolamine, 40% water and 40% isopropanol, until 13–15 g of methyl chloride is dissolved. Add an internal standard for GC analysis (10 g of isobutyl alcohol) and keep the mixture in a closed vessel at room temperature. Remove aliquots from the vessel at regular intervals and analyze by capillary GC (as described above). The methyl chloride is completely consumed within 6 h. Add a second charge of 13–15 g of methyl chloride and monitor the mixture by capillary GC as before. The second charge of methyl chloride is similarly consumed within 6 h. Three additional charges of methyl chloride are similarly consumed within 8 h., with no perceptible reduction in rate. At this point half of the ethanolamine is spent. Consumption of a sixth and seventh charge of methyl chloride is perceptibly slower.

EXAMPLE 2

Using substantially the same procedure as Example 1 and a 1 L of a solution of 20% ethanolamine, 20% water and 60% methanol, 5 charges of 13–15 g of methyl chloride are consumed within 24 h. Consumption of a sixth and seventh charge of methyl chloride is also complete within 24 h. However, dissolution of the methyl chloride during the seventh addition is perceptibly slower. Dissolution of an eighth charge of methyl chloride requires approximately 1.5 times as long as dissolution of the first charge.

EXAMPLE 3

Using substantially the same procedure as Example 1 and a 1 L of a solution of 20% ethanolamine, 40% water and 40% acetone, 1 charge of 13–15 g of methyl chloride is consumed within 8 h. Gradual degradation of ethanolamine in this solvent mixture was observed.

EXAMPLE 4

Using substantially the same procedure as Example 1, and 1 L of a solution of 20% ethanolamine, 10% water and 70% methanol, 3 charges of 13–15 g of methyl chloride are consumed within 24 hours, but the third charge reacts at a perceptibly slower rate.

EXAMPLE 5

Control experiments are run as follows:
A) Following the procedure of Example 1, a solution of 1 L of either 50% water and 50% isopropanol, or 30% water and 70% methanol, is charged with 13.3 g of methyl chloride. Analysis after 24 h. and 48 h shows no change in the level of methyl chloride present in solution.
B) The experiment of Example 5A is carried out in an open vessel. After 6 hours, 84% of the methyl chloride has escaped from the 50:50 mixture of isopropanol/water, while 75% has escaped from the 30:70 mixture of methanol/water after 5 hours.

We claim:

1. A process for destructively scrubbing methyl chloride gas comprising contacting the gas with a scrubbing solution comprising ethanolamine, water and a water soluble organic solvent selected from methanol, ethanol or isopropanol, wherein the ratio of the solvent to water is in the range of 1:3 to 10:1.

2. The process according to claim 1 wherein the ratio is about 1:1.

3. The process according to claim 1 wherein ethanolamine comprises about 20% of the solution.

4. The process according to claim 3 wherein the solvent comprises about 40%, and the water about 40% of the solution.

5. The process according to claim 4 wherein the solvent is isopropanol.

6. The process according to claim 1 wherein the solvent is methanol.

7. The process according to claim 6 wherein the ratio of solvent to water is in the range of from 1:1 to 10:1.

8. The process according to claim 7 wherein ethanolamine comprises about 20%, the solvent about 60%, and the water about 20% of the solution.

9. A process for destructively scrubbing methyl chloride gas comprising contacting the gas with a scrubbing solution comprising ethanolamine, water and a water soluble organic solvent, wherein the solvent is acetone and the ratio of the solvent to water is in the range of 1:4 to 10:1.

10. The process according to claim 9 wherein the ratio is about 1:1.

11. The process according to claim 9 wherein ethanolamine comprises about 20% of the solution.

12. The process according to claim 11 wherein the solvent comprises about 40%, and the water about 40% of the solution.

* * * * *